United States Patent

Wurst et al.

[15] 3,702,432
[45] Nov. 7, 1972

[54] INVERTERS USING CONTROLLED SEMICONDUCTOR RECTIFIERS

[72] Inventors: John W. Wurst, Dover; Robert M. Kanen, Long Valley, both of N.J.

[73] Assignee: The Singer Company, New York, N.Y.

[22] Filed: Aug. 21, 1969

[21] Appl. No.: 851,831

[52] U.S. Cl. ............................................. 321/45 R
[51] Int. Cl. ................................................ H02m 7/52
[58] Field of Search ............. 321/36, 43, 44, 45, 45 C

[56] References Cited

UNITED STATES PATENTS

| | | | |
|---|---|---|---|
| 3,117,272 | 1/1964 | Quinn | 321/36 |
| 3,300,706 | 1/1967 | Wellford | 321/43 |
| 3,317,816 | 5/1967 | Wilting | 321/45 |
| 3,417,315 | 12/1968 | Corey | 321/45 |

Primary Examiner—William M. Shoop, Jr.
Attorney—Marshall J. Breen and Chester A. Williams, Jr.

[57] ABSTRACT

A parallel D.C. to A.C. inverter uses triggered silicon controlled rectifiers (SCR's) in a power current flow circuit especially adapted to supply variable frequency currents to an induction motor load over a wide range of frequency, voltage and load power. A bifilar choke is used to prolong the discharge time of the commutating capacitor and to prevent high peak currents to the load during commutation. A first pair of diodes prevents discharge of the capacitor prior to commutation. A second pair of diodes provides alternate feedback paths for the return of energy stored in the magnetic circuit to the power supply immediately after commutation.

1 Claim, 2 Drawing Figures

PATENTED NOV 7 1972 3,702,432

INVENTORS
John W. Wurst
Robert M. Kanen

BY
Marshall J. Breen
ATTORNEY

WITNESS:
Marvin Rottenberg

INVERTERS USING CONTROLLED SEMICONDUCTOR RECTIFIERS

BACKGROUND OF THE INVENTION

Prior art inverter circuits using SCR's are known for providing an A.C. output to induction motor loads from a D.C. supply voltage. These have, in general, provided a single frequency output, or where variable output frequency has been obtained, the range of frequency variation has been severely limited for stable operation. The problem is related to the ability of the commutating capacitor to hold a voltage charge long enough to maintain previously conducting SCR in a reversed biased condition long enough to enable it to recover its forward blocking capability. This is particularly difficult at the higher output frequencies and for loads which vary considerably in size and power factor.

It is therefore a primary object of this invention to provide a reliable alternating driving voltage from a D.C. supply voltage, which alternating voltage shall be substantially free from adverse effects of variable load dissipation and power factor over a wide range of operating frequencies.

In attaining the objects of this invention a special bifilar choke is used. This choke comprises two mutually-insulated bifilar windings on a common magnetic core. The bifilar windings are each connected to an opposite end of the A.C. load winding and in series with a respective diode to opposite terminals of the commutating capacitor. In this circuit configuration the bifilar choke performs two important functions. Because the magnetic circuit of the choke is common to both windings, it smooths the flow of current from the D.C. source, preventing high peak currents from flowing during commutation in both halves of the load winding. Secondly, it is the major factor in controlling the charge on the commutating capacitor. During the first few microseconds of discharge, it retards the current flow thus increasing the discharge time while permitting the commutated SCR to recover its forward blocking condition.

DESCRIPTION OF THE INVENTION

Figure 1:
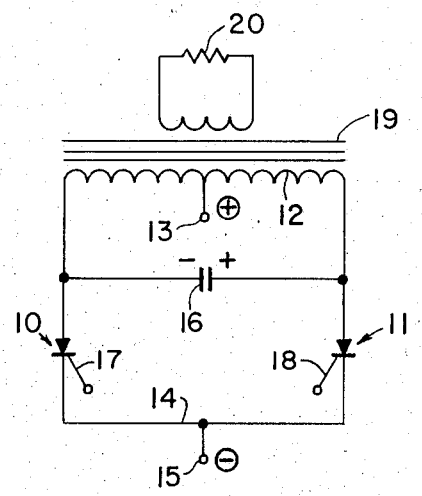
FIG. 1 is a schematic diagram illustrating a typical prior art circuit of a parallel inverter using silicon controlled rectifiers.

Referring to FIG. 1, a basic prior art circuit is shown comprising two SCR's 10 and 11, an A.C. load winding 12 having a centertap connected to a terminal 13 which is the positive side of a D.C. supply source (not shown). The SCR's 10 and 11 have their anodes connected respectively to opposite ends of the A.C. load winding 12 and their cathodes connected to a common line 14 connected to a terminal 15 which is the negative side of the D.C. power supply.

A commutating capacitor 16 is connected between the two anodes and triggering voltages are applied to the gates 17 and 18 on an alternative basis to cause SCR's 10 and 11 to conduct sequentially as is well known in this art. The frequency with which the triggering voltages are applied determines the frequency of the A.C. to the load winding 12.

The load winding 12 is shown, for simplicity, as the primary winding of a transformer 19 having its secondary connected to a load 20. However, it will be understood that the winding 12 may also itself be a phase winding of an induction motor or that the load 20 may be such a motor phase winding. In any case, it will be understood that winding 12 may connect with A.C. loads of varying size and power factor.

The operation of the circuit of FIG. 1 is as follows:

Current from the D.C. power source at terminal 13 enters the centertap of the A.C. load winding 12. It is permitted to flow alternately through each half of winding 12 depending on which SCR (10 or 11) has been triggered into conduction. Reversal of current flow, or commutation, occurs when the non-conducting SCR is triggered into the conducting state. The charge on capacitor 16 holds the previously conducting SCR in a reversed biased condition until that SCR recovers its forward blocking condition.

The problem with this circuit arises from the variation of the charge on the capacitor 16. When one SCR is conducting, the D.C. supply voltage (minus about 1 volt drop across the SCR) appears between the centertap and one end of the winding 12. By transformer action, a similar EMF is induced in the other half of the winding 12 such that the capacitor sees a voltage equal approximately to twice the supply voltage. In practice, this voltage varies with the frequency and load conditions so that under some circumstances insufficient energy is stored in the capacitor to insure commutation resulting in failure of the A.C. output.

To examine this process more particularly, assume that SCR 10 is conducting. The capacitor 16 then charges to the polarity shown in FIG. 1 with its positive terminal connected to the anode of SCR 11. When the SCR 11 is now triggered into conduction, SCR 10 sees the negative capacitor terminal at its anode and the positive terminal essentially at its cathode. Thus, SCR 10 is back-biased and turns off. If this capacitor voltage remains negative for longer than the SCR recovery time, which is typically 5 to 15 microseconds, the SCR 10 will not conduct again when the capacitor charge is consumed or reversed. However, the capacitor 16 can discharge through the winding 12 and through the power supply and in fact almost all of the discharge current does pass through the winding 12. If the load resistance 20 is small, or if the required power output of a motor load is high, which condition causes a low equivalent resistance to appear in the winding 12, then the capacitor discharges more rapidly. Consequently the reverse bias appears on the SCR (to be turned off) for a shorter period of time. In the limiting condition, this reverse bias is not sustained for as long as the required recovery time. Then both SCR 10 and SCR 11 remain in conduction, current consumption is high, and no alternating voltage output is produced.

Figure 2:
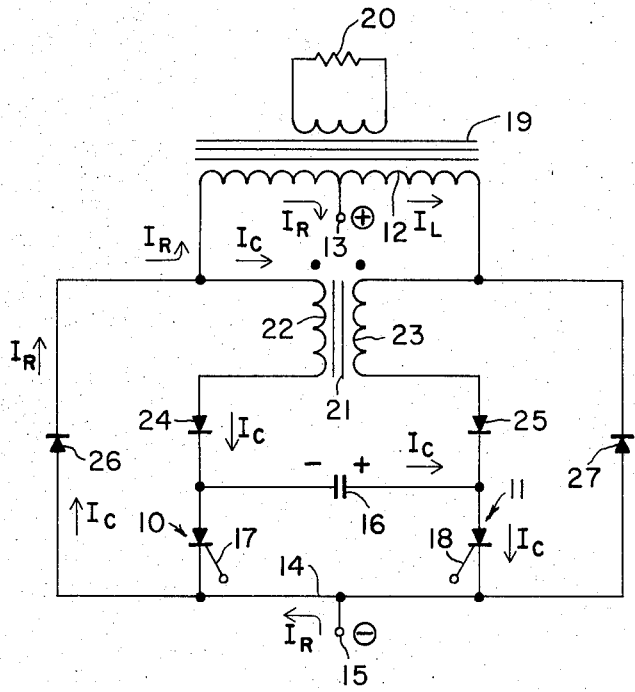
FIG. 2 is a schematic diagram illustrating an embodiment of the circuit of this invention.

With this failure process of the prior art circuit in mine, let us consider FIG. 2 which illustrates the circuit of the present invention, which latter overcomes the limitations of the prior art circuit pointed out above. In the circuit of FIG. 2 those elements having the same functions as those of FIG. 1 bear the same reference numbers.

Certain elements have been added which will now be described in detail:

A bifilar choke 21 comprises two identical mutually insulated windings 22 and 23 on a common magnetic core. The windings are as closely coupled as possible so that the reactive voltage generated in one winding is reflected immediately in the other winding. Winding 22 is connected in series with one end of load winding 12 and a diode 24 to the junction of the anode of SCR 10 with the capacitor 16. Winding 23 is connected in series with the opposite end of load winding 12 and a diode 25 to the junction of the anode of SCR 11 with the capacitor 16. The sense of the windings 22 and 23 is such as to produce the same instantaneous polarities at the same ends as conventionally shown by the dots placed near the ends of the windings. The diodes 24 and 25 are of a polarity to conduct current in the same direction as the SCR's 10 and 11 respectively. A feedback diode 26 of the polarity shown is connected between one end of the load winding 12 and the negative terminal 15 of the D.C. supply. A second feedback diode 27 of the polarity shown is connected between the opposite end of the load winding 12 and the negative terminal 15 of the D.C. supply.

The operation of the circuit of FIG. 2 is as follows:

Assume that capacitor 16 is charged with the polarity as indicated in FIG. 2 because SCR 10 is conducting. When a trigger pulse is applied to the gate 18, SCR 11 will go into a conducting state. Capacitor discharge current indicated by $I_c$ will flow through SCR 11, diode 26, choke winding 22, diode 24 and into the negative terminal of capacitor 16. SCR 10 is back-biased by this action and turns off. Choke winding 22 develops a voltage which opposes this current change and so prolongs the discharging time of the capacitor 16. Ultimately, the capacitor charge will approach zero at which time the voltage induced in winding 22 will reverse its polarity in an effort to keep the current flowing. In effect, energy stored in the capacitor 16 has been transferred to magnetic energy stored in the choke 21. This energy then returns to the capacitor 16 but charging it in such a direction that the polarity of its terminals is reversed from that shown. Diode 24 prevents its discharge and a peak charge is retained for the next commutating operation. This charge may be stored at a higher voltage than would be the case without the choke 21 because of series resonance effects. Depending on the characteristics of the choke 21, this voltage may be typically 2 to 10 times the peak voltage appearing across the terminals of load winding 12 and is substantially independent of the A.C. load.

The feedback diodes 26 and 27 function as follows: at the moment of commutation, motor current and flux cannot instantaneously reverse direction. For example, assume that SCR 11 is conducting and supplying current $I_L$ from the D.C. supply to the right hand half of load winding 12 as shown. When this current is suddenly blocked by SCR 11 turning off the flux will drive current $I_R$ in the same direction through the left hand half of winding 12 as shown. This current ($I_R$) flows towards the positive terminal 13 of the power supply, then reenters through the negative terminal 15 through diode 26 and back to the motor winding 12. As the force driving this current becomes less than the potential of the power supply, the current flow $I_R$ through the winding 12 decreases to zero and then builds up in the normal direction through SCR 10. This current ($I_R$) represents the reactive current that must be returned to the power supply from motor loads where the power factor is not unity. It will be noted that this flow of reactive current has no direct effect on the charging of capacitor 16.

Clearly, from the above, it will be evident that the choke 21 provides a charge and discharge path for the capacitor 16 which does not require commutation current to flow through the load winding 12 and therefore the commutation is essentially independent of load effects. Thus the circuit can be designed for good commutation with the assurance that load changes will not cause deterioration thereof. Since very little commutation power is dissipated in the load winding, the commutation process is more efficient and a smaller commutating capacitor may be used than in prior art circuits.

Further, a flow path for the reactive load currents due to low power factor loads is provided which is substantially isolated from any effect on the charge and discharge of the capacitor 16. Thus, changes in the load power factor can be tolerated without adverse effect on the commutation process.

By the attributes of this invention an inverter circuit has been provided which has the following advantages:

1. Reliable commutation over a wide range of frequency, load and power factor.
2. Smaller commutating capacitor than otherwise required.
3. Less commutation power dissipation in the load winding.
4. Nearly constant SCR hold-off time as operating conditions vary.

While the invention has been described in relation to a specific embodiment, many modifications and variations thereof will be readily apparent to those skilled in the art without departing from the inventive concept, the scope of which is set forth in the appended claims.

Having thus set forth the nature of the invention, what is claimed herein is:

1. An inverter circuit adapted to be connected to a D.C. supply source having positive and negative terminals, comprising: an A.C. load winding having a centertap connected to said positive terminal, a pair of gate controlled rectifiers each having an anode, a cathode and a gate, means connecting the cathodes together and to said negative terminal, a non-saturable choke having two mutually-insulated windings closely coupled on a common magnetic core, means connecting each of said choke windings in series between a respective opposite end of the load winding and the anode of a respective controlled rectifier, each of said series connections including a diode of such polarity as to conduct current in the same direction as the controlled rectifier, a commutating capacitor connected between the anodes of said controlled rectifiers, and a pair of feedback diodes, each connected between the negative terminal and a respective opposite end of the load winding and of a polarity to conduct current into the load winding.

* * * * *